(12) United States Patent
Jung et al.

(10) Patent No.: US 8,811,351 B2
(45) Date of Patent: Aug. 19, 2014

(54) METHOD FOR MEASURING CHANNEL QUALITY INFORMATION ON A DOWNLINK MULTI-CARRIER IN A WIRELESS COMMUNICATION SYSTEM USING CARRIER AGGREGATION

(75) Inventors: In Jae Jung, Anyang-si (KR); In Kwon Seo, Anyang-si (KR); Sang Wook Lee, Anyang-si (KR); Su Hwan Lim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 13/382,008

(22) PCT Filed: Jul. 7, 2010

(86) PCT No.: PCT/KR2010/004425
§ 371 (c)(1),
(2), (4) Date: Jan. 3, 2012

(87) PCT Pub. No.: WO2011/013918
PCT Pub. Date: Feb. 3, 2011

(65) Prior Publication Data
US 2012/0113859 A1     May 10, 2012

(30) Foreign Application Priority Data
Jul. 28, 2009    (KR) .................. 10-2009-0068850

(51) Int. Cl.
*H04W 4/00*     (2009.01)
*H04W 36/30*     (2009.01)

(52) U.S. Cl.
CPC .................... *H04W 36/30* (2013.01)
USPC ........................................ 370/332

(58) Field of Classification Search
USPC ......... 370/241, 310, 328, 329; 455/436, 509, 455/522
See application file for complete search history.

(56) References Cited

U.S. PATENT DOCUMENTS

| | | |
|---|---|---|
| 2007/0032199 A1 | 2/2007 | Chang et al. |
| 2007/0047493 A1 | 3/2007 | Park et al. |
| 2007/0082619 A1* | 4/2007 | Zhang et al. .................. 455/69 |
| 2008/0095108 A1* | 4/2008 | Malladi et al. .............. 370/329 |
| 2008/0130582 A1* | 6/2008 | Lee et al. .................... 370/332 |

(Continued)

FOREIGN PATENT DOCUMENTS

| | | |
|---|---|---|
| KR | 10-2007-0015996 A | 2/2007 |
| KR | 10-2007-0046699 A | 5/2007 |

(Continued)

*Primary Examiner* — Anh-Vu Ly
*Assistant Examiner* — Gustavo Lopez-Vargas
(74) *Attorney, Agent, or Firm* — Birch, Stewart, Kolasch & Birch, LLP

(57) ABSTRACT

The present invention relates to a method for measuring channel quality information in a system transmitting a signal via a plurality of component carriers. The method comprises the steps of: measuring a channel quality value of at least one component carrier allocated to a terminal from among a plurality of component carriers used to transmit a signal from a serving cell, to which the terminal belongs, to the terminal; comparing the channel quality value with a critical value for determining whether or not a channel quality of a component carrier not allocated to the terminal from among the plurality of component carriers must be derived; and, if the channel quality value is less than the critical value, measuring a channel quality value of a component not allocated to the terminal from among the plurality of component carriers.

10 Claims, 9 Drawing Sheets

(56) References Cited

U.S. PATENT DOCUMENTS

| | | | |
|---|---|---|---|
| 2008/0146231 A1* | 6/2008 | Huang et al. | 455/436 |
| 2009/0130986 A1 | 5/2009 | Yun et al. | |
| 2009/0274086 A1* | 11/2009 | Petrovic et al. | 370/312 |
| 2009/0291692 A1* | 11/2009 | Kazmi et al. | 455/452.2 |
| 2010/0296389 A1* | 11/2010 | Khandekar et al. | 370/216 |
| 2011/0134771 A1* | 6/2011 | Chen et al. | 370/252 |
| 2012/0057499 A1* | 3/2012 | Pedersen et al. | 370/252 |
| 2012/0155408 A1* | 6/2012 | Pedersen et al. | 370/329 |

FOREIGN PATENT DOCUMENTS

| | | |
|---|---|---|
| KR | 10-2007-0055641 A | 5/2007 |
| KR | 10-2007-0093615 A | 9/2007 |
| WO | WO 02/093757 A2 | 11/2002 |

\* cited by examiner

FIG. 4
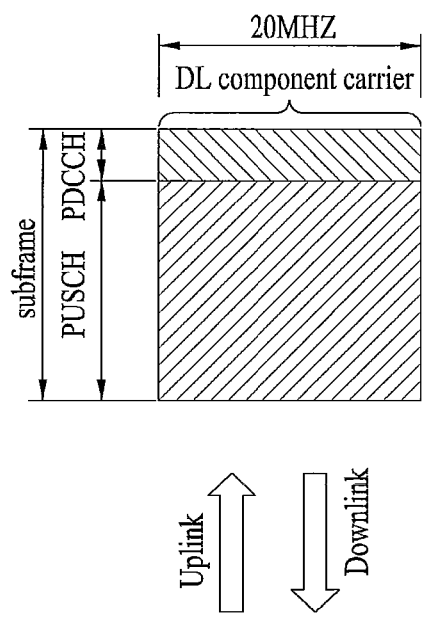
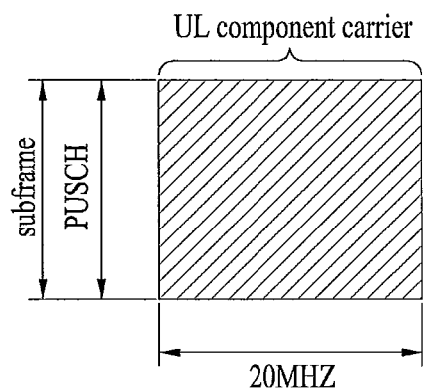
(a) single component carrier

METHOD FOR MEASURING CHANNEL QUALITY INFORMATION ON A DOWNLINK MULTI-CARRIER IN A WIRELESS COMMUNICATION SYSTEM USING CARRIER AGGREGATION

FIELD OF THE INVENTION

The present invention relates to a method for performing channel quality measurement of channels existing among specific user equipments and specific cells, which configure a mobile communication system, and, more particularly, to a method for measuring channel quality in a system having Carrier aggregation (CA) applied thereto, wherein carrier aggregation enhances transmission rate by using multiple Component Carriers (CCs).

BACKGROUND ART

In order to perform efficient communication, a receiving end should feed back channel information to a transmitting end. Generally, downlink channel information is transmitted from a user equipment to a base station via uplink, and uplink information is transmitted from a base station to a user equipment vie downlink. Such channel information is referred to as a Channel Quality Indicator (CQI). The channel quality information may be generated by using a variety of methods.

FIG. 1 illustrates exemplary generation and transmission of a channel quality indicator.

A user equipment measures the quality of a downlink channel, and, then, the user equipment reports a value of a channel quality indicator, which is selected based upon the measured quality, to the base station through an uplink control channel. Thereafter, based upon reported channel quality indicator, the base station performs downlink scheduling (user equipment selection, resource allocation, and so on).

More specifically, in a wireless communication system, when the base station allocates wireless (or radio) resource to the user equipment, the base station uses the channel quality indicator received from the user equipment.

The user equipment receives a pilot channel from the base station so as to calculate channel quality information, such as Signal to Interference Ratio (SIR). Then, the user equipment reports the channel quality information to the base station. Accordingly, the base station uses the channel quality information received from each user equipment so as to allocate wireless (or radio) resource to each base station.

The user equipment may periodically or aperiodically report the channel quality information to the base station. Additionally, the user equipment may also report the channel quality information to the base station through a Physical Uplink Control Channel (PUCCH) or a Physical Uplink Shared Channel (PUSCH).

Each of the Physical Uplink Control Channel and the Physical Uplink Shared Channel uses a different coding method. And, the decoding performance of the Physical Uplink Shared Channel is more excellent.

FIG. 2 illustrates physical channels that are used in a $3^{rd}$ Generation Partnership Project (3GPP) Long Term Evolution (LTE) system, which is an example of a mobile communication system and a general signal transmitting method using the same.

When a power of a user equipment is turned off and then turned back on, or when a user equipment newly enters (or accesses) a cell, the user equipment performs an initial cell search process, such as synchronizing itself with the base station in step S101. For this, the user equipment may receive a P-SCH (Primary Synchronization Channel) and an S-SCH (Secondary Synchronization Channel) from the base station so as to be in synchronization with the base station, and the user equipment may also acquire information, such as cell ID. Thereafter, the user equipment may receive a Physical Broadcast Channel so as to acquire broadcast information within the cell. Meanwhile, the user equipment may receive Downlink Reference Signal (DL RS), in the step of initial cell search, so as to verify the downlink channel status. The user equipment that has completed the initial cell search may receive a Physical Downlink Control Channel (PDCCH) and a Physical Downlink Shared Channel (PDSCH) based upon the Physical Downlink Control Channel (PDCCH) information, in step S102, so as to acquire more detailed system information. Meanwhile, the user equipment that has not yet completed the initial cell search may perform a Random Access Procedure, such as in steps S103 and S106 of a later process, so as to complete the access to the base station. In order to do so, the user equipment transmits a characteristic sequence through a Physical Random Access Channel (PRACH) as a preamble (S103), and then the user equipment may receive a response message respective to the random access through the PDCCH and its respective PDSCH (S104). In case of a contention based random access, excluding the case of a handover, the user equipment may perform Contention Resolution Procedures, such as transmitting an additional Physical Random Access Channel (PRACH) (S105) and receiving a Physical Downlink Control Channel (PDCCH) and a Physical Downlink Shared Channel (PDSCH) corresponding to the PDCCH.

After performing the above-described procedures, the user equipment may receive a Physical Downlink Control Channel (PDCCH)/Physical Downlink Shared Channel (PDSCH) (S107), as a general uplink/downlink signal transmission procedure, and may then perform Physical Uplink Shared Channel (PUSCH)/Physical Uplink Control Channel (PUCCH) transmission (S108). In the recent 3GPP (3rd Generation Project Partnership), the standardization procedure for the development of an LTE system is currently in progress, and the early LTE user equipments and base stations are already under development. One of the most emphasized characteristics of all types of wireless communication systems that are currently being developed, including the LIE system, is mobility. More specifically, in order to prevent any problem in communication from occurring, due to the change in channels with respect to the movement of the user equipment, a cell to which the corresponding user equipment currently belongs and its neighboring cell should be consistently monitored, and the cell that effectively receives services shall be changed.

FIG. 3 illustrates an example showing a situation wherein the user equipment is moved (or relocated) so as to enter the coverage of a neighboring cell. As shown in FIG. 1, if the user equipment was initially communicating with cell A at time T1, and, due to the movement of the user equipment, if the user equipment has moved outside of the coverage of cell A and into the coverage of cell B, at time T2, it will be difficult for the user equipment to perform reliable communication with cell A. Accordingly, reliable communication may be available if the initial communication channel is disconnected, and if the user equipment is connected to a communication channel with cell B. Depending upon an RRC (Radio Resource Control) protocol state, when an RRC connection is configured, the user equipment may be in an RRC_CONNECTED state. And, when an RRC connection is not available, the user equipment is in an RRC_IDLE state. When the user equipment is in an RRC_IDLE state, a cell reselection for a handover may be performed, and system information may be acquired. And, when the user equipment is in an RRC_CONNECTED state, the user equipment is in a handover state.

Generally, in order to perform the above-described cell reselection or handover, the channel state of a cell to which the current user equipment belongs and the channel state of its neighboring cell should be consistently measured and monitored.

In a mobile communication system, when a packet is being transmitted, the transmitted packet is transmitted through a wireless (or radio) channel. Therefore, signal distortion may occur during the transmission process. In order to allow the receiving end to correctly (or properly) receive such distorted signal, the receiving end is required to be informed of (or to figure out) the respective channel information, so as to compensate for the distortion occurring in the transmitted signal from the received signal in accordance with the informed channel information. A general method that is used in order to be informed of (or to figure out) the channel information, a signal known to both the receiving end and the transmitting end is transmitted. Then, when the transmitted signal is received through the corresponding channel, information on the corresponding channel is obtained based upon the distortion degree occurring in the received signal. Herein, the signal that is known to both the receiving end and the transmitting end is referred to as a pilot signal or a Reference Signal (hereinafter also referred to as RS). Recently, in most of the mobile communication systems, when a packet is being transmitted, in case data are transmitted and received by using multiple antennas, a reference signal exists for each transmission antenna. And, by being information of the channel status between each transmission antenna and each reception antenna, a correct signal may be received.

In the current LTE system, the channel quality state between a user equipment and a cell is measured by using a RSRP (Reference Signal Receiving Power). More specifically, the user equipment accumulates pilot signals transmitted from each cell with respect to a designated time and bandwidth, so as to measure a received signal power of each cell.

In an environment having a cell, to which the corresponding user equipment belongs, co-exist with a plurality of neighboring cells, the user equipment measures the RSRP for each of the serving cell, to which the user equipment belongs, and the neighboring cells.

Since the user equipment is provided with mobility, the channel quality for each cell may vary depending upon the respective time. And, at a specific time point, a cell having better channel quality than that of the cell, to which the current user equipment belongs, may be detected. When the user equipment detects a cell having better channel quality than that of its serving cell for a predetermined period of time, the user equipment may become communicating with the cell having the better channel quality.

The standardization process for the current 3GPP LTE (3rd Generation Partnership Project Long Term Evolution) system is practically completed. And, presently, the standardization process for the LTE-A (Long Term Evolution Advance) for supporting a more enhanced transmission rate than that of the LTE system is under development.

In the LTE-A system, in order to enhance the transmission rate, Carrier Aggregation (CA) is being applied. Hereinafter, Carrier Aggregation will be described in detail.

FIG. 4 illustrates an example showing an uplink band and a downlink band in a general FDD type wireless mobile communication system. As shown in FIG. 3, in a general FDD type wireless mobile communication system, data transmission and reception is realized through one downlink band of 20 MHz and its corresponding uplink band.

Recently, however, in order to support larger uplink and downlink bandwidths, and in order to support a larger number of uplink and downlink bandwidths, a system that is configured of larger uplink and downlink bandwidths by collecting (or grouping) multiple Compnent Carriers (CCs) is being researched and developed.

FIG. 5 illustrates an exemplary bandwidth of the FDD type wireless mobile communication system, when applying carrier aggregation. Most particularly, FIG. 4 shows an example wherein 5 component carriers each corresponding to 20 MHz are grouped in each of the uplink and the downlink, so as to support a bandwidth of 100 MHz. In the 3GPP LTE-A (LTE-Advanced) system, which is currently being designed, multiple component carriers each having a maximum bandwidth of 20 MHz are grouped so as to be capable of supporting a larger uplink and downlink bandwidth.

As shown in FIG. 2, it may be understood that the conventional LIE system uses only one component carrier, and the RSRP for the signal that is being transmitted from the corresponding carrier may be used as a reference value for measuring channel quality.

In a system using multiple component carriers, in order to measure the channel quality, the system should decide a specific component carrier, so as to use the signal being transmitted from the decided component carrier to measure channel quality.

Firstly, when the user equipment performs channel quality measurement with respect to the serving cell, to which the corresponding user equipment belongs, the user equipment should decide which component carrier it will be using in order to measure the channel quality.

For example, as shown in FIG. 4, when it is assumed that the number of component carriers existing in the cell, to which the corresponding user equipment belongs, is equal to 5, the user equipment may be allocated with a maximum of 5 component carriers. Herein, the 5 component carriers may all be allocated to the user equipment, or only a selected number of component carriers among the 5 component carriers may be allocated to the user equipment so as to be used. In this case, the user equipment shall select the component carriers it will be using in order to perform the channel quality state measurement of the serving cell, to which the corresponding user equipment belongs.

Secondly, in order to perform effective cell reselection and handover, the user equipment is required to measure and monitor the channel quality of a neighboring cell. Accordingly, when the neighboring cell uses multiple component carriers so as to transmit a signal, a specific component carrier shall be selected among the multiple component carriers, in order to measure the channel quality state. A Neighbor Cell List (NCL), which includes information on the neighboring cells, corresponds to information that is notified to the user equipment by the serving cell, to which the corresponding user equipment belongs. Therefore, in the LTE system, the Neighbor Cell List is a selective option. Generally, in the LTE system, information on an Intra-frequency cell is not given to the user equipment. And, for an Inter-frequency)/RAT (Radio Access Technology) cell, information on the frequency, to which the corresponding cell belongs, and information on the specific system that is being used is provided to the user equipment.

When an intra-frequency neighboring cell using a frequency identical to that used by the cell, to which the user equipment belongs, uses carrier aggregation as the above-described information on the neighboring cell, the user equipment is unaware of the component carrier that is being used for transmitting a signal. Also, in case carrier aggregation is used for the inter-frequency/RAT neighboring cell, the user equipment is not informed of the information on the component carrier. Therefore, a problem may occur in measuring the channel quality between the user equipment and the neighboring cell.

DETAILED DESCRIPTION OF THE INVENTION

Technical Objects

A technical object of the present invention, which the present invention seeks to achieve, is to provide, a method performed by a user equipment for measuring a channel quality state of a serving cell, to which the user equipment belongs, and that of a neighboring cell, when both the serving cell including the user equipment and the neighboring cell uses carrier aggregation.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to achieve the object of the present invention, according to an embodiment of the present invention, in a system transmitting a signal to by using multiple component carriers, a method for measuring channel quality information includes the steps of measuring a channel quality value of one or more component carriers allocated to a user equipment, among multiple component carriers that are used by a serving cell, to which the user equipment belongs, for transmitting a signal to the user equipment; comparing the channel quality value with a threshold value for deciding whether or not to calculate a channel quality value of a component carrier that is not allocated to the user equipment, among the multiple component carriers; and, when the channel quality value is less than the threshold value, measuring the channel quality value of the component carrier that is not allocated to the user equipment, among the multiple component carriers.

The channel quality value of the one or more component carriers allocated to the user equipment, among the multiple component carriers, may be obtained by calculating an average value of any one of RSRP (Reference Signal Received Power), RSRQ (Reference Signal Receive Quality), and RSST (Reference Signal Strength Indicator) of a Reference Signal, the Reference Signal being included in the one or more component carriers allocated to the user equipment.

According to another exemplary embodiment of the present invention, in a system transmitting a signal by using multiple component carriers, a method for measuring channel quality information includes the steps of measuring a channel quality value of one or more component carriers allocated to a user equipment, among multiple component carriers that are used by a serving cell, to which the user equipment belongs, for transmitting a signal to the user equipment; comparing the channel quality value with a threshold value for deciding whether or not to calculate a channel quality value of a specific component carrier among multiple component carriers that are supported by a neighboring cell; and, when the channel quality value is less than the threshold value, calculating a channel quality value of the specific component carrier, which is predetermined, of the neighboring cell.

The channel quality value of the one or more component carriers allocated to a user equipment may be obtained by calculating an average value of any one of RSRP (Reference Signal Received Power), RSRQ (Reference Signal Receive Quality), and RSSI (Reference Signal Strength Indicator) of a Reference Signal, the Reference Signal being included in the one or more component carriers allocated to the user equipment.

The method may further include the step of receiving designation information designating the specific component carrier.

The designation information may be transmitted to the user equipment through dedicated data, the dedicated data including only information on the specific component carrier.

The information may be transmitted to the user equipment through a Neighbor Cell List (NCL), the Neighbor Cell List (NCL) including information on a neighboring cell.

According to yet another exemplary embodiment of the present invention, in a system transmitting a signal to by using multiple component carriers, a user equipment includes a processing unit and a memory unit, each being electrically connected to one another. Herein, the processing unit may measure a channel quality value of one or more component carriers allocated to the user equipment, among multiple component carriers that are used by a serving cell, to which the user equipment belongs, for transmitting a signal to the user equipment, may compare the channel quality value with a threshold value for deciding whether or not to calculate a channel quality value of a component carrier that is not allocated to the user equipment, among the multiple component carriers, and, when the channel quality value is less than the threshold value, may measure the channel quality value of the component carrier that is not allocated to the user equipment, among the multiple component carriers. Also, the memory unit may store the measured channel quality value.

Among the multiple component carriers, the processing unit may obtain the channel quality value of the one or more component carriers allocated to the user equipment, by calculating an average value of any one of RSRP (Reference Signal Received Power), RSRQ (Reference Signal Receive Quality), and RSSI (Reference Signal Strength Indicator) of a Reference Signal, the Reference Signal being included in the one or more component carriers allocated to the user equipment.

According to a further exemplary embodiment of the present invention, in a system transmitting a signal by using multiple component carriers, a user equipment includes a processing unit and a memory unit, each being electrically connected to one another. Herein, the processing unit may measure a channel quality value of one or more component carriers allocated to the user equipment, among multiple component carriers that are used by a serving cell, to which the user equipment belongs, for transmitting a signal to the user equipment, may compare the channel quality value with a threshold value for deciding whether or not to calculate a channel quality value of a specific component carrier among multiple component carriers that are supported by a neighboring cell, and, when the channel quality value is less than the threshold value, may calculate a channel quality value of the specific component carrier, which is predetermined, of the neighboring cell. Also, the memory unit may store the measured channel quality value.

Among the multiple component carriers, the processing unit may obtain the channel quality value of the one or more component carriers allocated to the user equipment, by calculating an average value of any one of RSRP (Reference Signal Received Power), RSRQ (Reference Signal Receive Quality), and RSSI (Reference Signal Strength Indicator) of a Reference Signal, the Reference Signal being included in the one or more component carriers allocated to the user equipment.

The user equipment may further include a receiving unit being electrically connected to the processing unit. Herein the receiving unit may be configured to receive designation information designating the specific component carrier.

The receiving unit may be configured to receive the designation information through dedicated data, the dedicated data including only information on the specific component carrier.

The receiving unit may be configured to receive the information through a Neighbor Cell List (NCL), the Neighbor Cell List (NCL) including information on a neighboring cell.

Effects of the Invention

According to the exemplary embodiments of the present invention, by measuring the channel quality state of a serving cell, to which a user equipment belongs, and the channel quality state of a neighboring cell, effective cell reselection and handover may be performed.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

FIG. 4 illustrates an example showing an uplink band and a downlink band in a general FDD type wireless mobile communication system.

BEST MODE FOR CARRYING OUT THE PRESENT INVENTION

Reference will now be made in detail to the preferred embodiments of the present invention, examples of which are illustrated in the accompanying drawings, so that anyone skilled in the art can easily implement the embodiments of the present invention. However, it will be apparent that the present invention may be implemented in a variety of different structures, and, therefore, the present invention will not be limited only to the exemplary embodiments presented herein. Furthermore, in the accompanying drawings, in order to clearly describe the embodiments of the present invention, any parts irrelevant to the description of the present invention will be omitted. And, wherever possible, similar reference numbers will be used throughout the drawings to refer to the same or like parts.

Throughout the entire description of the present invention, when it is said that a specific part "comprises (or includes)" a specific element, unless mentioned differently, this does not exclude any other element and rather signifies that the specific part may further include other elements. Also, terms including the suffixes "... unit", "... device", "module", and so on, may refer to units for processing at least one or more functions or operations. And, herein, such elements may be realized in the form of hardware, or software, or a combination of hardware and software.

Hereinafter, a method for measuring channel quality information in a multi carrier system according to an exemplary embodiment of the present invention will be described in detail.

Figure 1:
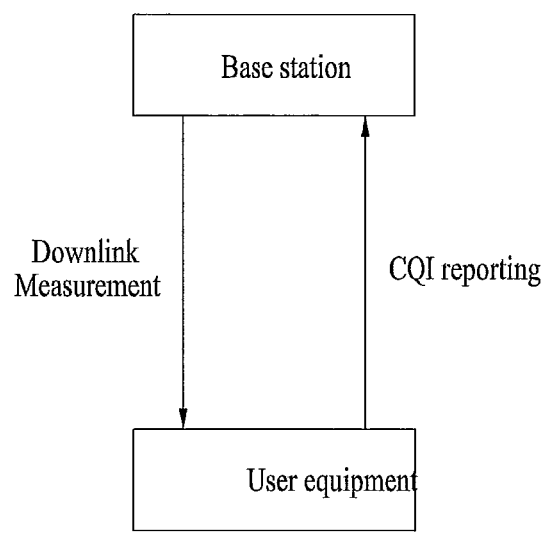
FIG. 1 illustrates exemplary generation and transmission of a channel quality indicator.
Figure 2:
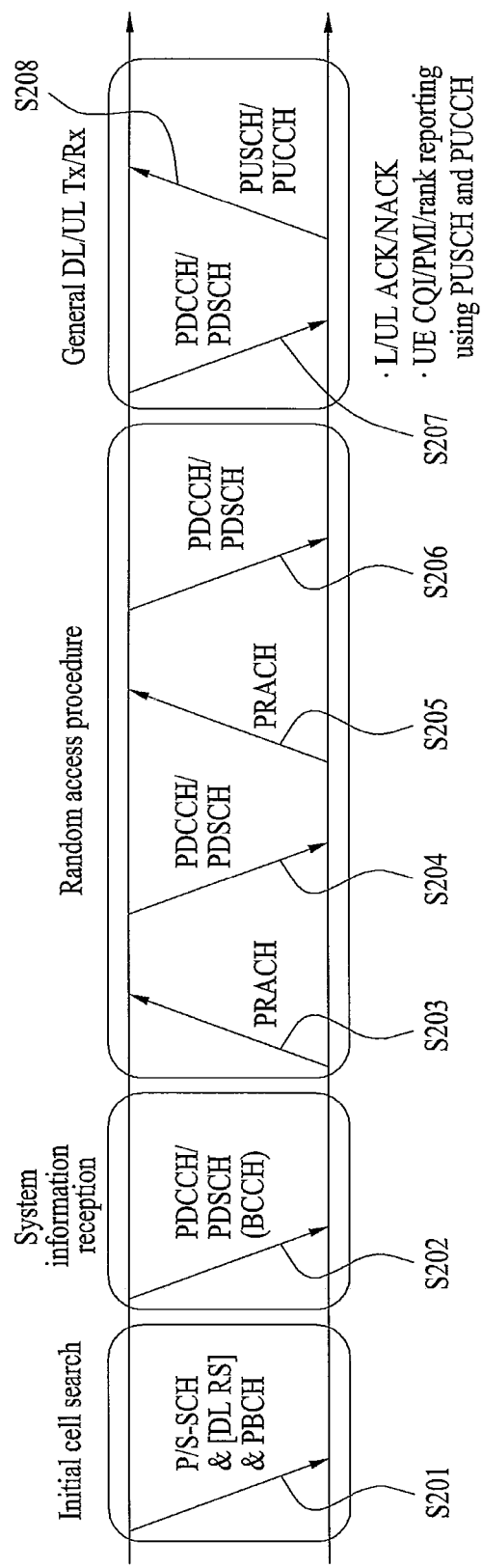
FIG. 2 illustrates an example showing a signal processing procedure performed by a user equipment in order to transmit an uplink signal.
Figure 3:
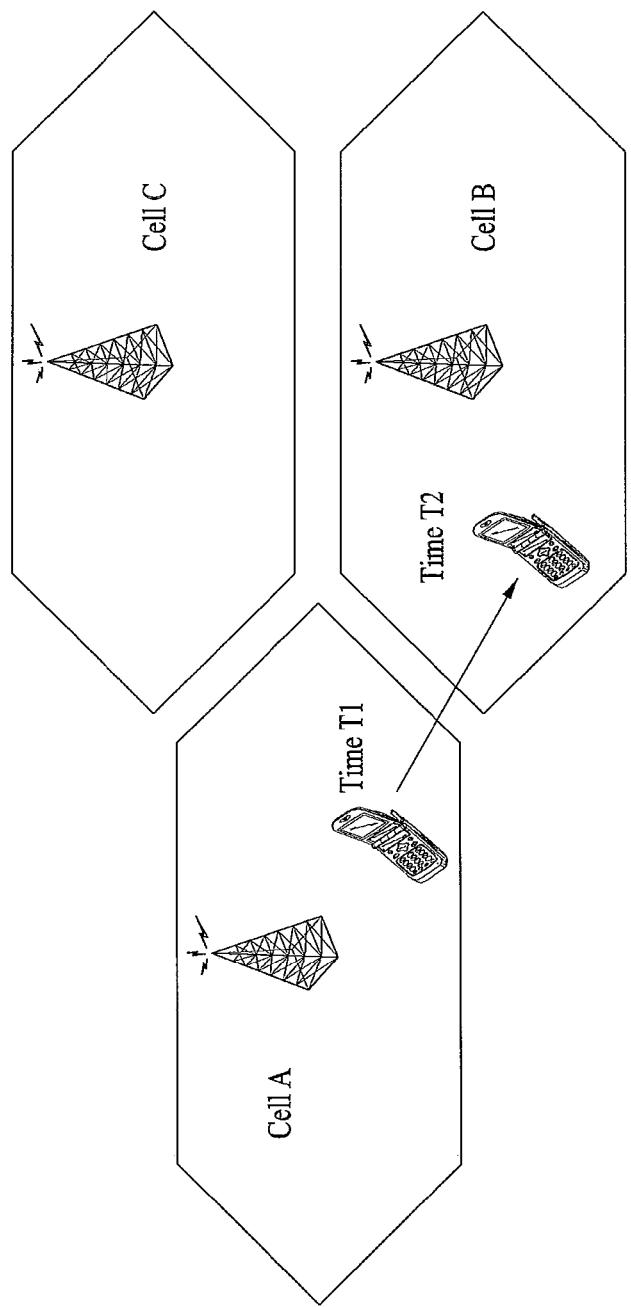
FIG. 3 illustrates an example showing a situation wherein the user equipment is moved (or relocated) so as to enter the coverage of a neighboring cell.
Figure 5:
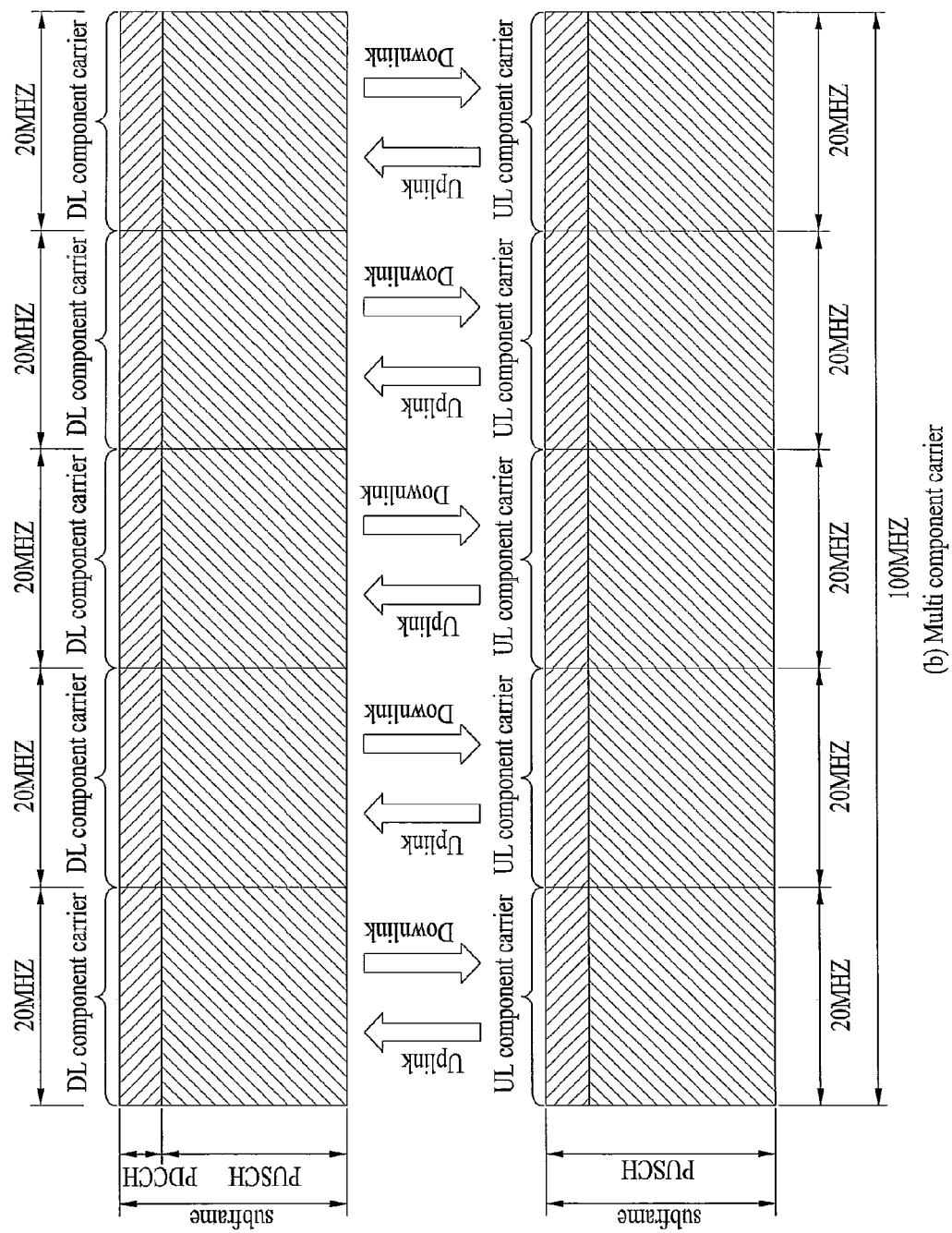
FIG. 5 illustrates an exemplary bandwidth of the FDD type wireless mobile communication system, when applying carrier aggregation.
Figure 6:
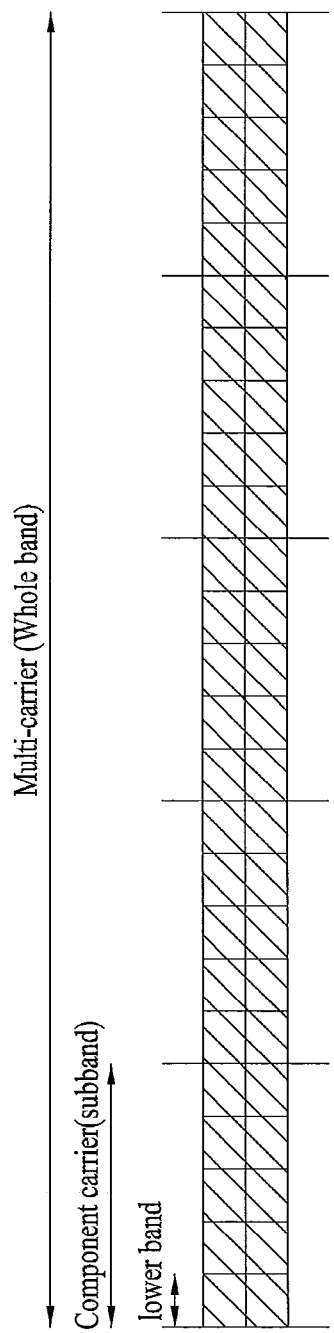
FIG. 6 illustrates an example of multi carriers in a method for transmitting channel quality information according to an exemplary embodiment of the present invention.

FIG. 6 illustrates an example of multi carriers in a method for transmitting channel quality information according to an exemplary embodiment of the present invention.

Referring to FIG. 6, the multi-carrier indicates the overall (or whole) frequency band used by the base station, and the multi-carrier has the same meaning as the whole band. For example, in an LTE-A system, the multi-carrier corresponds to 100 MHz.

A Component Carrier (CC) refers to an element carrier configuring a multi-carrier. More specifically, a plurality of component carriers configures a multi-carrier through carrier aggregation. Also, a component carrier includes a plurality of lower bands. At this point, when the term multiple carriers is replaced with the term whole band, component carrier may be replaced with subband, and a lower band may be replaced with partial band. Furthermore, carrier aggregation may also be referred to as bandwidth aggregation.

Herein, carrier aggregation refers to grouping (or aggregating) a plurality of carriers so as to expand the bandwidth in order to increase the data rate (or transmission rate). For example, the LTE system has one carrier of 20 MHz, and the LTE-A system groups 5 carriers of 20 MHz, so as to expand the bandwidth to up to 100 MHz. Furthermore, carrier aggregation includes aggregating carriers existing on different frequency bands.

In a system using carrier aggregation, a method for effectively measuring channel quality state of each cell may be broadly divided into two different types.

First of all, when a serving cell transmits a signal using multiple component carriers, the present invention proposes a method of measuring channel quality between the user equipment itself and its serving cell.

The user equipment first measures the channel quality for each component carrier allocated to the user equipment itself. Then, by using the channel quality values measured from each component carrier, the user equipment measures the overall (or whole) channel quality. At this point, the whole (or overall) channel quality may be obtained by calculating an average value of the channel quality values measured from each component carrier. Herein, however, the method of obtaining channel quality by calculating an average value is merely exemplary. And, therefore, the present invention will not be limited only to the example presented herein.

When the channel quality value exceeds a specific threshold value, as longs as there is no problem in communication even when using the currently allocated component carriers, channel quality measurement may be performed only on the allocated component carrier.

Conversely, when the channel quality value drops below the specific threshold value, i.e., when it is difficult to provide reliable communication by using only the currently allocated component carrier, by performing channel quality measurement also on component carriers that are not allocated to the user equipment, the channel quality measurement for a handoff or cell reselection may be reported.

Figure 7:
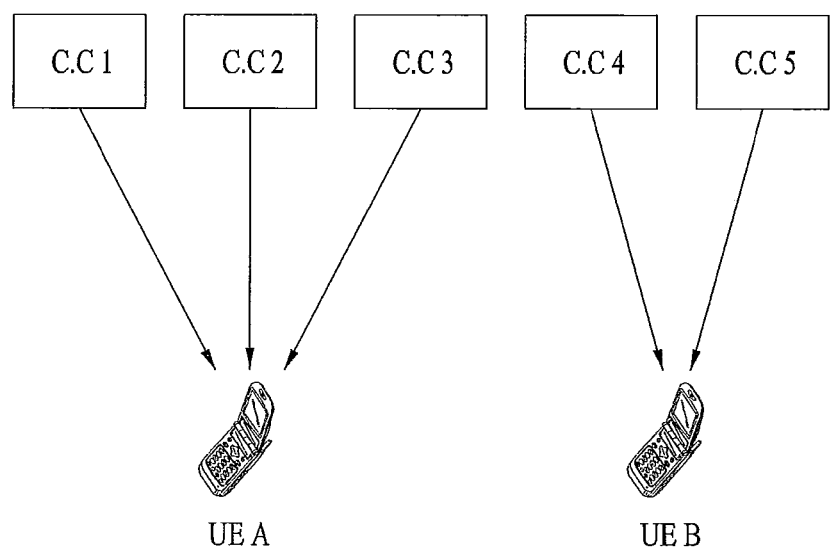
FIG. 7 illustrates an example showing component carriers being allocated for each user equipment of a serving cell according to an exemplary embodiment of the present invention.

FIG. 7 illustrates an example showing component carriers being allocated for each user equipment of a serving cell according to an exemplary embodiment of the present invention. As shown in FIG. 7, for example, it will be assumed that the serving cell, to which the corresponding user equipment belongs, is configured of 5 component carriers. And, it will also be assumed that component carriers 1, 2, and 3 are allocated to user equipment A (UE A in FIG. 7) and also that component carriers 4 and 5 are allocated to user equipment B (UE B in FIG. 6).

When user equipment A measures channel quality of the cell to which it belongs, then user equipment A essentially measures the RSRP for the component carriers (marked as C.C in FIGS. 7) 1, 2, and 3, which are allocated to user equipment A itself. The user equipment then uses the RSRP (Reference Signal Received Power) value for each component carrier allocated to the user equipment itself, so as to calculate channel quality value S. Herein, in addition to RSRP, diverse metrics, such as RSRQ (Reference Signal Receive Quality) or RSSI (Received Signal Strength Indicator), may be used as information used for measuring the channel quality. And, when obtaining the average value of one or more component carriers, diverse methods, such as arithmetic average (or mean) value, weighted average (or mean), and so on, may be used.

The user equipment compares the channel quality value S with a threshold value $S_{component\_carrier}$ for deciding whether or not to measure the channel quality of component carriers, which are not allocated to the corresponding user equipment. If the channel quality value S is greater than the threshold value $S_{component\_carrier}$, then, among the component carriers of the serving cell, to which user equipment A belongs, user equipment A measures the channel quality of only component carriers 1, 2, and 3. And, user equipment A does not measure the channel quality of component carriers 4 and 5, which are not allocated to user equipment A.

If the channel quality value S is less than the threshold value $S_{component\_carrier}$, user equipment A measures the channel quality of the component carriers 4 and 5, which are not allocated to user equipment A. Thereafter, when a link having better channel quality than the link between user equipment A and the current component carriers 1, 2, and 3 is detected, the user equipment A may disconnect its connection with the current component carriers and may perform operations for configuring a new link with new component carriers.

More specifically, by differentiating operations of the user equipment respective to when the channel quality S is better than the threshold value $S_{component\_carrier}$ and when the channel quality S is worse than the threshold value $S_{component\_carrier}$, when the channel quality between the user equipment and the current component carriers is excellent, unnecessary channel quality measurement processes may be reduced. The component carrier information of the cell, to which the corresponding user equipment belongs, may be notified through a Broadcast Channel (BCH).

Secondly, when a neighboring cell uses multiple component carriers, the present invention proposes a method for measuring a channel quality state respective to the neighboring cell.

As described above, generally, it is assumed that when a neighboring cell uses carrier aggregation, the user equipment is unaware of the component carrier that is being used at the neighboring cell. In this case, the system should notify the user equipment of the specific component carrier(s) that is (or are) being used by the neighboring cell. Accordingly, the description of the present invention will propose a method of notifying the user equipment of information on a specific component carrier of the neighboring cell that is used for transmitting the signal.

At this point, by informing the user equipment of all component carriers that are used by the neighboring cell, the user equipment may use the reference signal being transmitted from each component carrier, so as to measure the channel quality of the neighboring cell. Thus, a reliable channel quality state may be measured. However, if information on all component carriers used by all neighboring cells is notified to the user equipment, a massive amount of information will be delivered to the user equipment. Thus, a problem may occur in the aspect of an uplink signaling overhead.

In light of carrier aggregation, it may be understood that the current LTE system corresponds to a system using only one (1) component carrier. More specifically, it may be understood that the channel quality state of the neighboring cell is measured based upon the information of only one (1) component carrier. In a cell using multiple component carriers, when only one (1) component carrier is used for measuring the channel quality state, it may be estimated that channel estimation similar to that of the conventional LTE system may be performed.

Accordingly, the present invention proposes a method of designating one cell specific component carrier for each cell and notifying such designation to the user equipment, instead of informing the user equipment of all component carriers used by the neighboring cells. This information may be notified by being added to the Neighbor Cell List (NCL), which includes information on the neighboring cells. Alternatively, the information on all component carriers used by the neighboring cells may be notified to the user equipment by using designated data carrying only the information on the component carriers of the neighboring cells. Based upon the cell specific component carrier information, the user equipment may measure the channel quality state of all neighboring cells using carrier aggregation.

First of all, the user equipment measures the channel quality value S of the serving cell by using the above-described method. When the channel quality value S of the serving cell is greater than a threshold value $S_{intrasearch}$ for deciding whether or not to measure the channel quality state of a neighboring cell, the user equipment does not measure the channel quality state of an intra-frequency neighboring cell and the channel quality state of an inter-frequency/RAT neighboring cell having a priority level equal to or lower than the intra-frequency neighboring cell.

If the channel quality value S of the serving cell is less than the threshold value $S_{intrasearch}$, and if the channel quality value S of the serving cell is greater than a threshold value $S_{nonintrasearch}$ for deciding whether or not to measure the channel quality state of an inter-frequency neighboring cell, the user equipment measures only the channel quality state of the intra-frequency neighbor cell. Herein, when the intra-frequency neighboring cell transmits a signal by using carrier aggregation, the user equipment should select a component carrier for performing channel quality measurement. At this point, since the user equipment has already been signaled in advance with a cell specific component carrier of the neighboring cell, the channel quality of which the user equipment seeks to measure, the user equipment may measure the channel quality of the Intra-frequency neighboring cell based upon this information.

If the channel quality value S of the serving cell is less than the threshold value $S_{nonintrasearch}$, the user equipment measures the channel quality state of an inter-frequency/RAT neighboring cell having a priority level equal to or lower than the Intra-frequency neighboring cell. At this point, if the inter-frequency neighboring cell is using carrier aggregation, the user equipment shall select a component carrier for performing the channel quality state measurement of the neighboring cell. As described above, if the inter-frequency neighboring cell uses carrier aggregation, just as the intra-frequency neighboring cell, a cell specific component carrier for the corresponding cell is signaled to the user equipment. And, therefore, based upon the signaled information, the user equipment may measure the channel quality state of the inter-frequency neighboring cell.

Meanwhile, since the inter-RAT neighboring cell, i.e., a UTRAN or GSM based neighboring cell, does not use carrier aggregation, just as the conventional LTE system, the user equipment measures channel quality of the inter-RAT neighboring cell based upon frequency information respective to the inter-RAT neighboring cell, the frequency information being received from the serving cell.

By combining the above-described method for measuring channel quality between the user equipment itself and the cell, to which the user equipment belongs, which is used when the serving cell transmits a signal by using multiple component carriers, with the above-described method for measuring the channel quality state of a neighboring cell, which is used when the neighboring cell uses multiple component carriers, a method performed by the user equipment for measuring channel quality of the serving cell, to which the user equipment belongs, and of the neighboring cell in a system applying carrier aggregation will hereinafter be described in detail.

Figure 8:
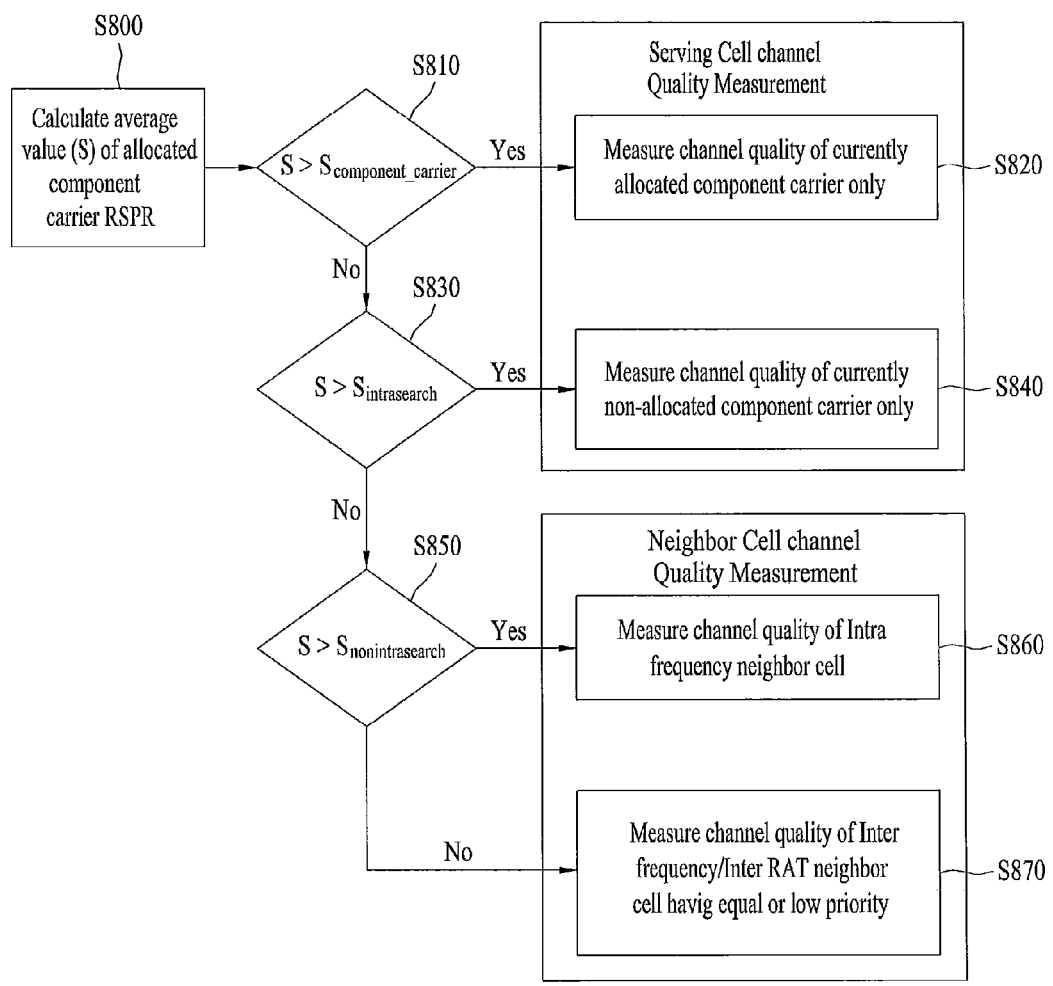
FIG. 8 illustrates a flow chart showing the process steps of a method performed by the user equipment for measuring channel quality of a cell, to which the user equipment belongs, and channel quality of a neighboring cell in a system applying carrier aggregation according to an exemplary embodiment of the present invention.

FIG. 8 illustrates a flow chart showing the process steps of a method performed by the user equipment for measuring channel quality of a cell, to which the user equipment belongs, and channel quality of a neighboring cell in a system applying carrier aggregation according to an exemplary embodiment of the present invention.

The user equipment then uses the RSRP (Reference Signal Received Power) value for each component carrier allocated to the user equipment itself, so as to calculate channel quality value S (Step 701). At this point, the channel quality value S may be obtained by calculating an average value of the channel quality values measured from each component carriers. However, the method of calculating the average value of the measured channel quality values is merely exemplary. And, therefore, the present invention will not be limited only to the examples given herein.

The user equipment compares the channel quality value S with a specific threshold value $S_{component\_carrier}$ for deciding whether or not to measure the channel quality of a component carrier, which is not allocated to the corresponding user equipment (Step 702). In step 702, if the channel quality value S is greater than the specific threshold value $S_{component\_carrier}$ then, among the component carriers of the serving cell, to which user equipment A belongs, user equipment A measures the channel quality of only component carriers, which are allocated to user equipment A. And, user equipment A does not measure the channel quality of component carrier, which is not allocated to user equipment A (Step 703).

In step 702, if the channel quality value S is less than the threshold value $S_{component\_carrier}$, user equipment A determines whether or not the channel quality value S is greater than a $S_{intrasearch}$ value for deciding whether or not to channel quality between user equipment A and a component carrier that is not allocated to user equipment A (Step 703). Then, if the channel quality value S is greater than the $S_{intrasearch}$ value, the user equipment A performs channel quality measurement of the component carrier that is presently not allocated to user equipment A (Step 704). Thereafter, when a link having better channel quality than the link between user equipment A and the current (or present) component carriers is detected, the user equipment A may disconnect its connection with the current component carriers and may perform operations for configuring a new link with new component carriers.

The present invention proposes a method of designating one cell specific component carrier for each cell and notifying such designation to the user equipment, instead of informing the user equipment of all component carriers used by the neighboring cells. This information may be notified by being added to the Neighbor Cell List (NCL), which includes information on the neighboring cells. Alternatively, the information on all component carriers used by the neighboring cells may be notified to the user equipment by using designated data carrying only the information on the component carriers of the neighboring cells. Based upon the cell specific component carrier information, the user equipment may measure the channel quality state of all neighboring cells using carrier aggregation.

Then, in step 703, if the channel quality value S is less than the $S_{intrasearch}$ value, the user equipment A determines whether or not the channel quality value S is greater than the $S_{nonintrasearch}$ value for deciding whether or not to measure the channel quality state of a neighboring cell (Step 705). Then, based upon the determined result, if the channel quality value S is greater than the $S_{nonintrasearch}$ value for deciding whether or not to measure the channel quality state of a neighboring cell, the user equipment performs channel quality measurement of an intra-frequency neighbor cell. Herein, when the intra-frequency neighboring cell transmits a signal by using carrier aggregation, the user equipment should select a component carrier for performing channel quality measurement. At this point, since the user equipment has already been signaled in advance with a cell specific component carrier of the neighboring cell, the channel quality of which the user equipment seeks to measure, the user equipment may measure the channel quality of the intra-frequency neighboring cell based upon this information.

If, in step 705, the channel quality value S of the serving cell is less than the threshold value $S_{nonintrasearch}$, the user equipment measures the channel quality state of an inter-frequency/RAT neighboring cell having a priority level equal to or lower than the intra-frequency neighboring cell. At this point, if the inter-frequency neighboring cell is using carrier aggregation, the user equipment shall select a component carrier for performing the channel quality state measurement of the neighboring cell. As described above, if the inter-frequency neighboring cell uses carrier aggregation, just as the intra-frequency neighboring cell, a cell specific component carrier for the corresponding cell is signaled to the user equipment. And, therefore, based upon the signaled information, the user equipment may measure the channel quality state of the inter-frequency cell.

Meanwhile, since the inter-RAT neighboring cell, i.e., a UTRAN (UMTS Terrestrial Radio Access Network) or GSM (Global System for Mobile Communications) based neighboring cell, does not use carrier aggregation, just as the conventional LTE system, the user equipment measures channel quality of the inter-RAT neighboring cell based upon frequency information respective to the inter-RAT neighboring cell, the frequency information being received from the serving cell.

By using the above-described method for measuring channel quality, the user equipment measures channel quality information between a serving cell and the user equipment or between a neighboring cell and the user equipment and feeds back the measured channel quality information to the base station. Thereafter, when the base station transmits a signal to the user equipment, the base station may use the fed-back channel quality information.

Figure 9:
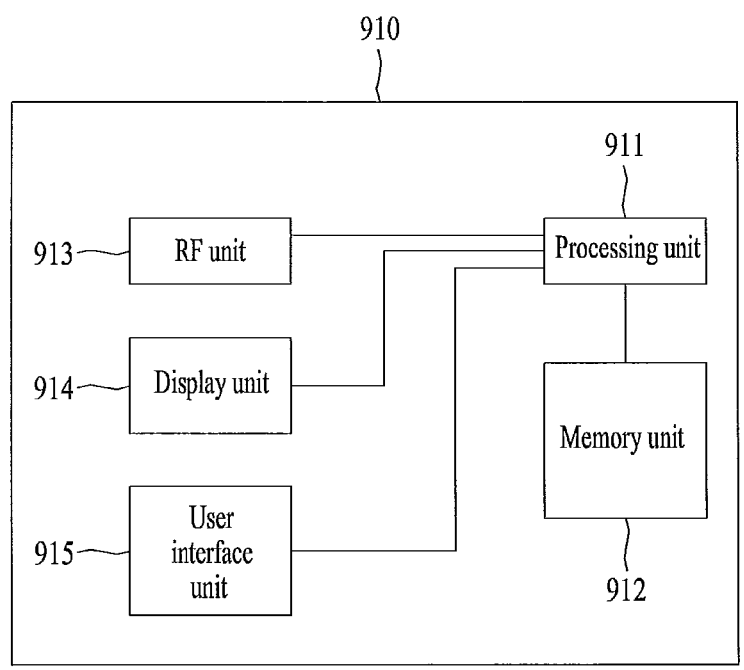
FIG. 9 illustrates a block view showing the structures of a device that can be applied to a base station and a user equipment and that can perform the embodiment of the present invention.

FIG. 9 illustrates a block view showing the structures of a device that can be applied to a base station and a user equipment and that can perform the embodiment of the present invention. As shown in FIG. 9, a device (910) includes a processing unit (991), a memory unit (912), an RF (Radio Frequency) unit (913), a display unit (914), and a user interface unit (915). A layer of a physical interface protocol is performed in the processing unit (991). And, the processing unit (991) provides a control plane and a user plane. The function of each layer is performed by the processing unit (991). The memory unit (912) is electrically connected to the processing unit (991) and stores an operating system, applications, and general files. If the device (910) corresponds to a user device, the display unit (914) may display diverse information. And, the display unit (914) may be realized by using as LCD (Liquid Crystal Display), OLED (Organic Light Emitting Diode) as disclosed herein. The user interface unit (915) may be configured by being combined with any one of the disclosed user interfaces, such as a keypad, a touchscreen, and so on. RF unit (913) is electrically connected to the processing unit (911) and either transmits or receives radio signals.

In the description of the present invention, the embodiments of the present invention will be described by mainly focusing on the data transmission and reception relation between the base station and the terminal (or user equipment). Herein, the base station may refer to a terminal node of the network that performs direct communication with the terminal. Occasionally, in the description of the present invention, particular operations of the present invention that are described as being performed by the base station may also be performed by an upper node of the base station.

More specifically, in a network consisting of multiple network nodes including the base station, diverse operations that are performed in order to communicate with the terminal may be performed by the base station or b network nodes other than the base station. Herein, the term Base Station (BS) may be replaced by other terms, such as eNB (evolved Node B) fixed station, Node B, access point, and so on. Also, in the description of the present invention, the term 'Terminal' corresponds to a UE (User Equipment), and the term 'Terminal' may be replaced by terms including, MS (Mobile Station), SS (Subscriber Station), MSS (Mobile Subscriber Station), and so on.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

It is apparent that claims that do not have any explicit citations within the scope of the claims of the present invention may either be combined to configure another embodiment of the present invention, or new claims may be added during the amendment of the present invention after the filing for the patent application of the present invention.

Industrial Applicability

The present invention may be used in a user equipment (or user terminal), a base station, or any other equipment of a wireless mobile communication system.

What is claimed is:

1. A method for measuring channel quality information in a system transmitting a signal by using multiple component carriers, the method comprising:
   measuring a channel quality value of one or more component carriers allocated to a user equipment, among multiple component carriers that are used by a serving cell, to which the user equipment belongs;
   measuring a second channel quality value of one or more component carriers not allocated to the user equipment, among the multiple component carriers that are used by the serving cell, when the first channel quality value is less than a first threshold value; and measuring a third channel quality value of a specific component carrier of neighboring cell, when the second channel quality value is less than a second threshold value, wherein said measuring of the first, the second and the third channel quality values are performed in order of (1) the one or more component carriers allocated to a user equipment, (2) the one or more component carriers not allocated to the user equipment, and (3) the specific component carrier of the neighboring cell.

2. The method of claim 1, wherein the first channel quality value of the one or more component carriers allocated to a user equipment is obtained by calculating an average value of any one of RSRP (Reference Signal Received Power), RSRQ (Reference Signal Receive Quality), and RSSI (Reference Signal Strength Indicator) of a Reference Signal, the Reference Signal being included in the one or more component carriers allocated to the user equipment.

3. The method of claim 1, further comprising receiving designation information designating the specific component carrier.

4. The method of claim 3, wherein the designation information is transmitted to the user equipment through dedicated data, the dedicated data including only information on the specific component carrier.

5. The method of claim 3, wherein the information is transmitted to the user equipment through a Neighbor Cell List (NCL), the Neighbor Cell List (NCL) including information on a neighboring cell.

6. In a system transmitting a signal by using multiple component carriers, a user equipment comprising:
 a processing unit and a memory unit, each being electrically connected to one another, and
 wherein the processing unit
  measures a channel quality value of one or more component carriers allocated to the user equipment, among multiple component carriers that are used by a serving cell, to which the user equipment belongs, when the first channel quality value is less than a first threshold value,
  measure a second channel quality value of one or more component carriers not allocated to the user equipment among the multiple component carriers that are used by the serving cell, when the first channel quality value is less than the first threshold value,
  measures a third channel quality value of a specific component carrier of a neighboring cell, when the second channel quality value is less than a second threshold value,
 wherein the processing unit measures the first, the second and the third channel quality values in order of (1) the one or more component carriers allocated to a user equipment, (2) the one or more component carriers not allocated to the user equipment, and (3) the specific component carrier of the neighboring cell, and
 wherein the memory unit stores any one or more of the first, second and third channel quality values which were measured.

7. The user equipment of claim 6, wherein the processing unit obtains the channel quality value of the one or more component carriers allocated to the user equipment, by calculating an average value of any one of RSRP (Reference Signal Received Power), RSRQ (Reference Signal Receive Quality), and RSSI (Reference Signal Strength Indicator) of a Reference Signal, the Reference Signal being included in the one or more component carriers allocated to the user equipment.

8. The user equipment of claim 6, further comprises:
 a receiving unit being electrically connected to the processing unit, and wherein the receiving unit is configured to receive designation information designating the specific component carrier.

9. The user equipment of claim 8, wherein the receiving unit is configured to receive the designation information through dedicated data, the dedicated data including only information on the specific component carrier.

10. The user equipment of claim 8, wherein the receiving unit is configured to receive the information through a Neighbor Cell List (NCL), the Neighbor Cell List (NCL) including information on a neighboring cell.

* * * * *